(12) United States Patent
Shang et al.

(10) Patent No.: US 11,717,770 B2
(45) Date of Patent: Aug. 8, 2023

(54) VARIABLE FLUIDIC RESTRICTOR HAVING SELECTIVE RESTRICTION

(71) Applicant: Waters Technologies Corporation, Milford, MA (US)

(72) Inventors: Zongren Shang, Westborough, MA (US); Stanislaw Koziol, Wrentham, MA (US); Joseph D. Michienzi, Plainville, MA (US); Michael Eggertson, Natick, MA (US); Keith Fadgen, Whitinsville, MA (US)

(73) Assignee: Waters Technologies Corporation, Milford, MA (US)

( * ) Notice: Subject to any disclaimer, the term of this patent is extended or adjusted under 35 U.S.C. 154(b) by 0 days.

(21) Appl. No.: 17/716,367

(22) Filed: Apr. 8, 2022

(65) Prior Publication Data
US 2022/0226750 A1   Jul. 21, 2022

Related U.S. Application Data

(62) Division of application No. 16/545,845, filed on Aug. 20, 2019, now Pat. No. 11,325,055.

(60) Provisional application No. 62/720,302, filed on Aug. 21, 2018.

(51) Int. Cl.
*B01D 15/16* (2006.01)
*G01N 30/32* (2006.01)

(52) U.S. Cl.
CPC ........... *B01D 15/163* (2013.01); *G01N 30/32* (2013.01); *G01N 2030/324* (2013.01); *G01N 2030/328* (2013.01)

(58) Field of Classification Search
CPC ................. B01D 15/163; G01N 30/32; G01N 2030/324; G01N 2030/328
See application file for complete search history.

(56) References Cited

U.S. PATENT DOCUMENTS

| 3,961,534 | A | 6/1976 | Gundelfinger |
| 9,304,115 | B2 | 4/2016 | Bunner et al. |
| 9,683,975 | B2 | 6/2017 | Sims |
| 2005/0118075 | A1 | 6/2005 | Nichols et al. |
| 2017/0100682 | A1 | 4/2017 | Wikfors |

OTHER PUBLICATIONS

Final Office Action in U.S. Appl. No. 16/545,845 dated Nov. 10, 2021.
Non-Final Office Action in U.S. Appl. No. 16/545,845 dated Jun. 1, 2021.
Notice of Allowance in U.S. Appl. No. 16/545,845 dated Jan. 25, 2022.

(Continued)

*Primary Examiner* — Benjamin L Lebron
(74) *Attorney, Agent, or Firm* — Schmeiser, Olsen & Watts LLP; Jason A. Murphy, Esq.

(57) ABSTRACT

A variable fluidic restrictor of a liquid chromatography system including a stator body, the stator body include a plurality of fluidic channels located within the stator body, wherein each fluidic channel of the plurality of fluidic channels includes a restrictor element, wherein a flow of a fluid through the variable fluidic restrictor is selectively restricted based on a position of an external element coupled to the stator body is provided. Furthermore, an associated method is also provided.

6 Claims, 7 Drawing Sheets

(56) References Cited

OTHER PUBLICATIONS

Restriction Requirement in U.S. Appl. No. 16/545,845 dated Mar. 8, 2021.
International Search Report and Written Opinion in related international patent application No. PCT/US19/047268, dated Dec. 10, 2019; 15 pages.
International Preliminary Report on Patentability in PCT/US2019/047268 dated Mar. 4, 2021.

VARIABLE FLUIDIC RESTRICTOR HAVING SELECTIVE RESTRICTION

RELATED APPLICATIONS

This application is a division of U.S. patent application Ser. No. 16/545,845, filed on Aug. 20, 2019, entitled "Variable Fluidic Restrictor Having Selective Restriction" which is a non-provisional patent application claiming priority to U.S. Provisional Patent Application No. 62/720,302, filed Aug. 21, 2018, entitled "Variable Fluidic Restrictor Having Selective Restriction," which is incorporated herein by reference.

FIELD OF TECHNOLOGY

The following relates to embodiments of a variable fluidic restrictor, and more specifically to embodiments of a variable fluidic restrictor for selectively restricting a flow of at least one fluid.

BACKGROUND

Liquid chromatography is a technique in analytic chemistry where distinct components of a mixture are identified by separating the individual components by passing the mixture through a stationary phase using fluid flow so that the components elute at different rates. Liquid chromatography systems are typically comprised of a solvent delivery pump, an autosampler, a column, and a detector. The solvent delivery pump pumps mobile phase fluid through the system, the autosampler introduces the sample to be analyzed to the analytic flow path, the column contains the packing material used to effect separation, and the detector detects the separated components as they elute out of the column.

In certain liquid chromatography systems and other applications involving a mobile phase of a fluid, fluidic restrictors can be used to restrict a flow of the fluid to control pressure and flow rates within the system. A fixed fluidic restrictor cannot maintain a desired pressure differential over a large enough flow rate range for most high-performance liquid chromatography applications; fixed fluidic restrictors can only handle a small range of flow rate without causing sensing elements to exceed an operational range.

Thus, there is a need to vary the restriction to handle larger flow rate variations in high-performance liquid chromatography systems.

SUMMARY

A first general aspect relates to a variable fluidic restrictor of a liquid chromatography system, comprising: a stator body, the stator body include a plurality of fluidic channels located within the stator body, wherein each fluidic channel of the plurality of fluidic channels includes a restrictor element, wherein a flow of a fluid through the variable fluidic restrictor is selectively restricted based on a connection between outlets of the plurality of fluidic channels and an outlet of the stator body.

In an exemplary embodiment, the plurality of fluidic channels are interconnected, and each fluidic channel of the plurality of fluidic channels is a microfluidic channel defined in a diffusion bonded layer of the diffusion bonded block that is different from the diffusion bonded layer defined by other microfluidic channels.

In an exemplary embodiment, the external element is a rotary valve.

The variable fluidic restrictor may further include an inlet, the inlet receiving a mobile phase of a solvent of a liquid chromatography system, a pressure sensor positioned between the inlet and a first restrictor element of the plurality of fluidic channels, a pressure sensor positioned between a fluid channel of the external element and an outlet of the variable fluidic restrictor.

In an exemplary embodiment, the restrictor element may be a serpentine shaped section of fluidic channel.

In an exemplary embodiment, a position of the external element dictates whether the fluid flows through one restrictor element or more than one consecutive restrictor elements, prior to reaching an outlet of the variable restrictor. The flow of the fluid is selectively restricted to limit changes in pressure and flow rate across large flow rate ranges and large pressure ranges of the fluid flowing through a liquid chromatography system.

A second general aspect relates to a variable fluidic restrictor comprising: a stator body, the stator body being a diffusion bonded block, a first fluidic channel, the first fluidic channel located within the stator body and having a first restrictor element, and a first outlet, a second fluidic channel connected to the first fluidic channel, the second fluidic channel located within the stator body and having a second restrictor element and a second outlet, an external element in cooperation with the stator body, the external element having a fluidic channel fluidically coupled to an outlet of the variable fluidic restrictor, and at least one of: the first outlet and the second outlet, depending on a position of the external element.

In an exemplary embodiment, when the fluidic channel of the external element is fluidically coupled to the first outlet, a fluid flowing through the variable fluidic restrictor is restricted by the first restrictor element only, before reaching the outlet of the variable fluidic restrictor.

In an exemplary embodiment, when the fluidic channel of the external element is fluidically coupled to the second outlet, a fluid flowing through the variable fluidic restrictor is restricted by the first restrictor element and the second restrictor element, before reaching the outlet.

The variable fluidic restrictor may further include a third fluidic channel connected to the second fluidic channel, the third fluidic channel located within the stator body and having a third restrictor element and a third outlet. When the fluidic channel of the external element is fluidically coupled to the second outlet, a fluid flowing through the variable fluidic restrictor is restricted by the first restrictor element, the second restrictor element, and the third restrictor element, before reaching the outlet.

In an exemplary embodiment, the external element is a rotary valve that rotates to switch between a first position where the outlet of the variable restrictor is fluidically coupled to the first outlet of the first fluidic channel and a second position where the outlet of the variable restrictor is fluidically coupled to the second outlet of the second fluidic channel.

In an exemplary embodiment, the fluidic channel of the external element remains fluidically coupled to the outlet of the variable fluidic restrictor when the external element moves.

In an exemplary embodiment, the fluidic channel is comprised of a first arced channel portion and a second arced channel portion forming a single fluidic pathway, extending continuously from a first end of the fluidic channel to a second end of the fluidic channel, and the second arced channel portion is selectively fluidically coupled to one of the first outlet and the second outlet, depending on the position of the external element.

In an exemplary embodiment, the external element is an external valve.

In an exemplary embodiment, the variable fluidic restrictor is a component of a liquid chromatography system, located pre-column.

A third general aspect relates to a binary variable fluidic restrictor system, comprising: a stator body, the stator body having a first inlet, a second inlet, and a single outlet, a first plurality of fluidic channels, each fluidic channel of the first plurality of fluidic channels includes a restrictor element, wherein the first plurality of fluidic channels are interconnected such that a flow of a first solvent through the first plurality of fluidic channels from the first inlet is selectively restricted based on a position of a first external element coupled to the stator body, a second plurality of fluidic channels, each fluidic channel of the second plurality of fluidic channels includes a restrictor element, wherein the second plurality of fluidic channels are interconnected such that a flow of a second solvent through the second plurality of fluidic channels from the second inlet is selectively restricted based on a position of a second external element coupled to the stator body, and wherein a restricted flow of the first solvent is configured to be mixed with a restricted flow of the second solvent, prior to exiting the outlet.

In an exemplary embodiment, a mixed solvent exiting the outlet flows towards a column of a liquid chromatography system.

A fourth general aspect relates to a method for selective restriction of a flow of at least one solvent, the method comprising: forming a first fluidic channel in a first diffusion bonded layer of a diffusion bonded stator body, the fluidic fluid channel having a first restrictor element and a first outlet, interconnecting a second fluidic channel with the first fluidic channel, the second fluidic channel formed in a second diffusion bonded layer of the diffusion bonded stator body, and having a second restrictor element and a second outlet, and selectively fluidically connecting an outlet of the diffusion bonded stator body with at least one of the first outlet of the first fluidic channel and the second outlet of the second fluidic channel, to control a restriction of the flow of the at least one solvent.

The foregoing and other features of construction and operation will be more readily understood and fully appreciated from the following detailed disclosure, taken in conjunction with accompanying drawings.

BRIEF DESCRIPTION OF THE DRAWINGS

Some of the embodiments will be described in detail, with reference to the following figures, wherein like designations denote like members, wherein.

DETAILED DESCRIPTION

A detailed description of the hereinafter described embodiments of the disclosed apparatus and method are presented herein by way of exemplification and not limitation with reference to the Figures. Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure.

As a preface to the detailed description, it should be noted that, as used in this specification and the appended claims, the singular forms "a", "an" and "the" include plural referents, unless the context clearly dictates otherwise.

Figure 1:
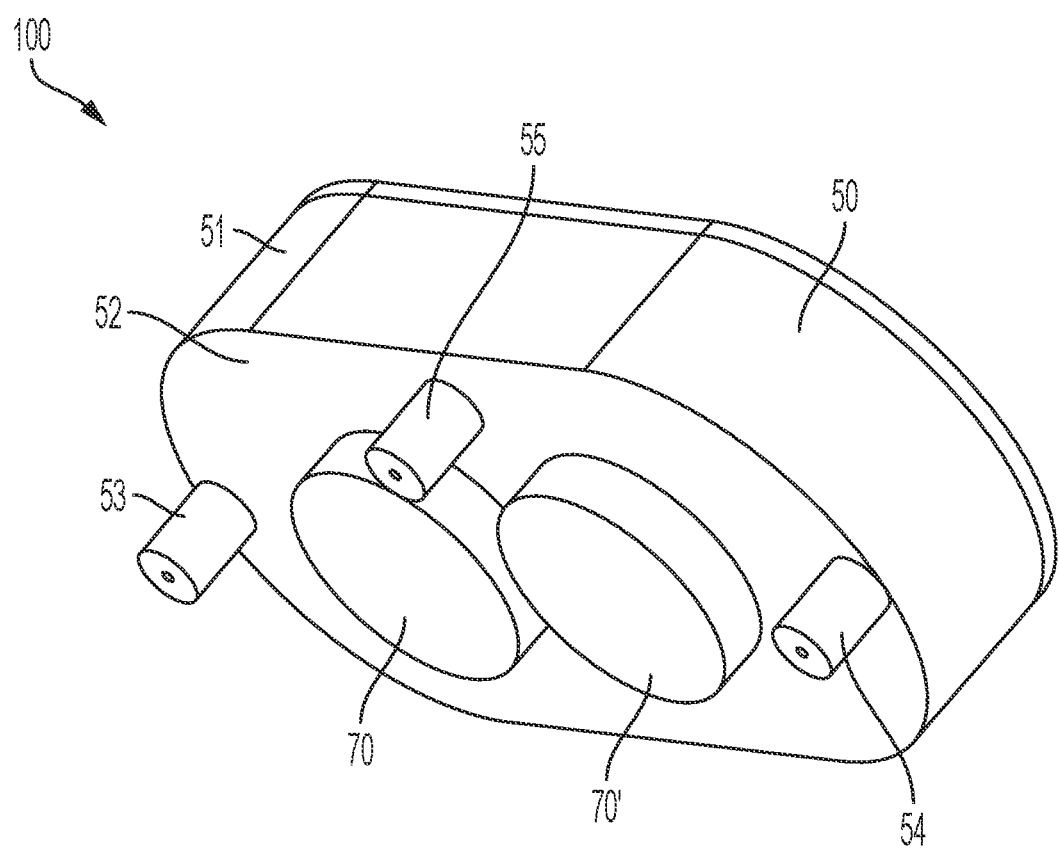
FIG. 1 depicts a perspective view of a variable fluidic restrictor, in accordance with embodiments of the present invention.

Referring to the drawings, FIG. 1 depicts a perspective view of a variable fluidic restrictor 100, in accordance with embodiments of the present invention. Embodiments of the variable fluidic restrictor 100 may be a component within a liquid chromatography system used to selectively restrict the flow of a mobile phase of at least one solvent. Embodiments of the variable fluidic restrictor 100 may be a component within fluid control systems other than liquid chromatography systems, for selectively restricting a flow of a fluid. Embodiments of the variable fluidic restrictor 100 may be a fluidic restrictor, a variable fluidic restrictor, a restrictor, and the like. Moreover, embodiments of the variable fluidic restrictor 100 may include a stator 50, one or more external elements 70, 70', one or more inlets 53, 54, and at least one outlet 55.

Embodiments of the stator body 50 may be a stator, a stator body, a stator array, a block, a diffusion bonded block, a stationary component configured to cooperate with a moving component, a body structure comprised of multiple diffusion bonded layers, and the like. The stator body 50 may include a sidewall surface 51 and a stator surface 52. The stator surface 52 may be configured to engage and seal against a surface of a corresponding external element 70, such as a rotor. Embodiments of the stator body 50 may be fabricated as a single plate using a solid-state diffusion bonding process in which two or more parallel layers of material are joined together. The layers are forced against each other under pressure at an elevated temperature (e.g., a temperature in a range of about 50% to 90% of the absolute melting point of the material) for a duration ranging from a few minutes to several hours). The pressure and temperature are then reduced before repeating one or more additional cycles at the elevated temperature and pressure. Examples of materials used to create the diffusion-bonded stator body include titanium, stainless steel, and various types of ceramics and polymers. The diffusion bonding process may be performed where one or more of the layers has a channel formed along a surface that will abut an adjacent surface of a neighboring layer. These internal or "embedded" channels, along with vertical channels formed at the ends of the channels, define fluidic channels used to communicate fluids through the stator body 50 and between the stator body 50 and the external element 70. Depending on the number of layers, a large number of fluidic channels may be formed in the stator body 50. In some embodiments, the fluid channels are defined between different layers at different depths so that some fluid channels may cross above or below other fluid channels to avoid interference and to allow for complex fluid channel configurations. The emedded or internal fluidic channels may be referred to a microfluidic channel. Fluids, such as a solvent, may flow through the fuidic channels located within the stator body 50, as opposed to fluidic tubing connecting one component to another component.

Embodiments of stator body 50 may be configured to cooperate with one or more external elements 70, 70' to selectively add or reduce restriction of a flow of the fluid through a system. Embodiments of the external elements 70, 70' may be configured to rotate or otherwise move with respect to the stator 50. In an operable or assembled configuration, the external elements 70, 70' may be coupled, attached, mounted, or otherwise engaged with the stator body 50, wherein a seal is effectuated therebetween so that fluid under pressure may flow through the plurality of fluidic channels internal to the stator body 50 to fluidic channels located within the external elements 70, 70'. In some embodiments, the external elements 70, 70' may be manufactured in a similar manner to the stator body 50, forming one or more fluidic channels internal or embedded within the external elements 70, 70'. Moreover, embodiments of the external elements 70, 70' may be two or more rotary valves that share a stator body 50 (i.e., stator "block") that includes a stator surface 52 that engages each valve. For example, the rotary valves may be rotary shear seal valves in which each valve has a rotor surface that is parallel to and in contact with the stator surface 52. Each rotor surface may be configured to rotate about an axis that is orthogonal to the rotor surface and the corresponding stator surface 52 on the stator body 50 during valve switching to reconfigure the communication of fluid flow paths coupled to the valve. When assembled as a rotary valve array, the stator surface 52 may engage a rotor surface of a corresponding actuator potion of a rotary valve, or similar external element. In an alternative embodiment, the external element may be an external valve or a shut-off valve. In another embodiment, the external element may be one or more external loops that connect the outlets of the plurality of fluidic channels located within the stator body 50 to the outlet 55 of the restrictor 100. In another embodiment, the external element may be a series of valves that effectively provide open flow or closed (e.g. dead ended) flow through its respective path.

With continued reference to FIG. 1, embodiments of the variable fluidic restrictor 100 may include a first inlet 53 and a second inlet 54. The inlets 53, 54 may receive a solvent under pressure that is pumped to the variable fluidic restrictor 100 from a solvent source. Embodiments of the first inlet 53 may be fluidically connected to a first solvent source of a liquid chromatography system, and the second inlet 54 may be fluidically connected to a second solvent source of the liquid chromatography system. The solvent of the first solvent source may be different than the solvent of the second solvent source. In exemplary embodiment, the first solvent source and the second solvent source may be water, acetonitrile, or other solvent suitable for used in liquid chromatography and high performance liquid chromatography. The first inlet 53 and the second inlet 54 may be fluidically connected to the solvents sources by fluidic connection tubing located external of the stator body 50. Further, embodiments of the inlets 53, 54 may include a fluidic pathway extending thererough that fluidically connects to the fluidic channels located within the stator body 50. For instance, the fluidic connection tubing carrying the solvents may be connected or otherwise attached to the inlets 53, 54 using a connector arrangement that effectuates a seal between the inlets 53, 54 and the fluidic tubing. Various connection arrangement may be used to couple the inlets 53, 54 and the external tubing in a sealing arrangement. The inlets 53, 54 may be positioned on the stator surface 52, and may protrude or otherwise extend a distance from the stator surface 52 of the stator body 50. In other embodiment, the inlets 53, 54 may be flush or substantially flush with the stator surface, and operate as a port or connector for attachment as described above.

Embodiments of the variable fluidic restrictor 100 may include at least one outlet 55. Embodiments of outlet 55 may be configured to allow a mixed solvent at a selected or controlled flow rate and/or pressure to exit the stator body 50. A fluidic connection tubing may be connected to or otherwise attached to the outlet 55 for transporting, delivering, carrying, etc. the mixed solvent or solvent towards a column of the liquid chromatography system. For instance, a fluidic connection tubing carrying the fluid exiting the outlet 55 may be connected or otherwise attached to the outlet 55 using a connector arrangement that effectuates a seal between the outlet 55 and the fluidic tubing. Various connection arrangements may be used to couple the outlet 55 and the external tubing in a sealing arrangement. The outlet 55 may be positioned on the stator surface 52, and may protrude or otherwise extend a distance from the stator surface 52 of the stator body 50. In other embodiment, the outlet 55 may be flush or substantially flush with the stator surface, and operate as a port or connector for attachment as described above. Further, embodiments of the outlet 55 may include a fluidic pathway extending thererough that fluidically connects to the fluidic channels located within the stator body 50 and external tubing delivering the outgoing fluid to the next component in a liquid chromatography system.

The embodiment shown in FIG. 1 depicts a binary variable fluidic restrictor, having two inlets 53, 54 and a single outlet 55. The inlets 53, 54 may be disposed on opposing sides of the stator body 50, with the outlet 55 located between the inlets 53, 54. However, various arrangements may be designed that position the inlets 53, 54 and outlet 55 in a different position than shown. The positioning of the inlets 53, 54 and outlet 55 may be determined in conjunction with an internal configuration of the plurality of fluid channels within the stator body 50. Additionally, the variable fluidic restrictor 100 may have any number of inlets and outlets. For example, the variable fluidic restrictor 100 may include more than two inlets or a single inlet, associated with a single outlet. In other embodiments, the variable fluidic restrictor 100 may include more than two outlets, with two or more inlets. Further, embodiments of the variable restrictor 100 may include more outlets than inlets. Specifically, flow splitting may be employed to deliver low flow rates from higher flow pumps, wherein most of the flow is split from a pump back to the solvent reservoir while only delivering a fraction of the delivery fluid to the resulting system.

Figure 2:
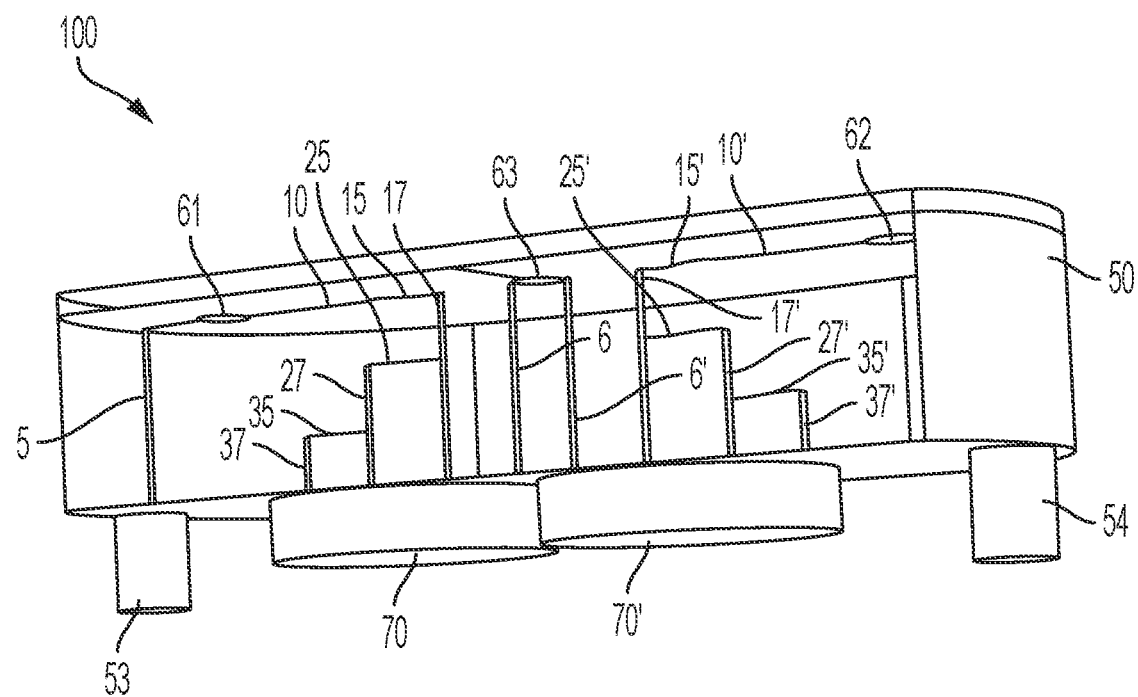
FIG. 2 depicts a first cutaway view of the variable fluidic restrictor of FIG. 1, showing a plurality of fluidic channels located within the stator body, in accordance with embodiments of the present invention.

Referring now to FIG. 2, which depicts a first cutaway view of the variable fluidic restrictor 100 of FIG. 1, showing a plurality of fluidic channels located within the stator body 50, in accordance with embodiments of the present invention. In the cutaway view of FIG. 2, the fluidic channels 5, 5', 6, 6', 10, 10', 17, 17', 25, 25', 27, 27', 35, 35', 37, 37' and other components are depicted by black and white lines, while the normally solid portions of the stator body 50 are shown transparent to allow viewing of the microfluidic channels within the stator body 50. Embodiments of the variable fluidic restrictor 100 may include a stator body 50 having a plurality of fluidic channels 5, 5', 6, 6', 10, 10', 17, 17', 25, 25', 27, 27', 35, 35', 37, 37' located within the stator body 50, wherein each fluidic channel 5, 5', 6, 6', 10, 10', 17, 17', 25, 25', 27, 27', 35, 35', 37, 37' of the plurality of fluidic channels 5, 5', 6, 6', 10, 10', 17, 17', 25, 25', 27, 27', 35, 35', 37, 37' includes a restrictor element 15, 15', 25, 25', 35, 35', wherein a flow of a fluid through the variable fluidic restrictor is selectively restricted based on a connection between outlets of the plurality of fluidic channels and an outlet of the stator body. A position of an external element 70, 70' may change to establish the connection between the outlets of the plurality of fluidic channels and the outlet. In another exemplary embodiment, the variable fluidic restrictor 100 may include a stator body 50, such as a diffusion bonded block, a first fluidic channel 10 located within the stator body 50 and having a first restrictor element 15 and a first outlet 17, a second fluidic channel connected to the first fluidic channel 10, the second fluidic channel located within the stator body 50 and having a second restrictor element 25 and a second outlet 27, and an external element 70 in cooperation with the stator body 50.

Embodiments of the variable fluidic restrictor 100 may include a vertical segment 5 fluidically connected to the inlet 53. Embodiments of the vertical segment 5 may be formed, for example, by drilling through one or more layers before diffusion bonding the layers together. The vertical segment 5 may connect the inlet 53 to a fluidic channel 10 on a different diffusion bonded layer of the stator body 50 than the entry point of the inlet 53 into the stator body 50. A sensor 61 may be positioned along fluidic channel 10 to measure a pressure and/or flow rate of the incoming solvent flowing into the stator body 50. Embodiments of the sensor 61 may be a pressure sensor, a transducer, a pressure transducer, flow rate sensor, or any sensing element capable of measuring and/or detecting a pressure and flow rate of a solvent flowing past the sensor 61 and communicating such data/information to a control system/computing system associated with the liquid chromatography system. A cavity within the stator body 50 may be created to house or otherwise accommodate the sensor 61, at a point along the fluidic channel 10. Further, embodiments of the fluidic channel 10 may have a restrictor element 15 for restricting the fluid flowing through the restrictor 100. Embodiments of the restrictor element 15 may be a section of the fluidic channel 10 that extends a distance that the solvent may travel, along a same diffusion bonded layer of the stator block. In an exemplary embodiment, the restrictor element 15 may be located at an end of the fluidic channel 10. An end of the restrictor element 15 may be connected to vertical segment 17, which may fluidically connect the fluidic channel 10, and the restrictor element 15, to a fluidic channel of the external element 70, described in greater detail infra. The vertical segment 17 may be formed, for example, by drilling through one or more layers before diffusion bonding the layers together.

A fluidic channel having a restrictor element 25 may interconnect with vertical segment 17 at some point along the vertical segment 17. For instance, the fluidic channel having restrictor 25 may connect, join, intersect, etc. with the vertical segment 17 at a different diffusion bonded layer than the diffusion bonded layer containing the fluidic channel 10. In an exemplary embodiment, the fluidic channel having restrictor 25 may connect, join, intersect, etc. with the vertical segment at a different diffusion bonded layer that is below the diffusion bonded layer containing the fluidic channel 10. Embodiments of the restrictor element 25 may be a section of fluidic channel connecting to the vertical segment 17 that extends a distance that the solvent may travel, along a same diffusion bonded layer of the stator block. In an exemplary embodiment, the restrictor element 25 may be located at an end of the fluidic channel connecting to the vertical segment 17. An end of the restrictor element 25 may be connected to vertical segment 27, which may fluidically connect the fluidic channel associated with the restrictor element 25, to a fluidic channel of the external element 70, described in greater detail infra. The vertical segment 27 may be formed, for example, by drilling through one or more layers before diffusion bonding the layers together.

A fluidic channel having a restrictor element 35 may interconnect with vertical segment 27 at some point along the vertical segment 27. For instance, the fluidic channel having restrictor 35 may connect, join, intersect, etc. with the vertical segment 27 at a different diffusion bonded layer than the diffusion bonded layer containing the fluidic channel connecting to the vertical segment 17. In an exemplary embodiment, the fluidic channel having restrictor 35 may connect, join, intersect, etc. with the vertical segment 27 at a different diffusion bonded layer that is below the diffusion bonded layer containing the fluidic channel connecting to vertical segment 17. Embodiments of the restrictor element 35 may be a section of fluidic channel connecting to the vertical segment 27 that extends a distance that the solvent may travel, along a same diffusion bonded layer of the stator block. In an exemplary embodiment, the restrictor element 35 may be located at an end of the fluidic channel connecting to the vertical segment 27. An end of the restrictor element 35 may be connected to vertical segment 37, which may fluidically connect the fluidic channel associated with the restrictor element 35, to a fluidic channel of the external element 70, described in greater detail infra. The vertical segment 37 may be formed, for example, by drilling through one or more layers before diffusion bonding the layers together.

Furthermore, embodiments of the variable fluidic restrictor 100 may also include a vertical segment 5' fluidically connected to the inlet 54, on an opposing side of the stator body 50. Embodiments of the vertical segment 5' may be formed, for example, by drilling through one or more layers before diffusion bonding the layers together. The vertical segment 5' may connect the inlet 54 to a fluidic channel 10' on a different diffusion bonded layer of the stator body 50 than the entry point of the inlet 54 into the stator body 50. A sensor 62 may be positioned along fluidic channel 10' to measure a pressure and/or flow rate of the incoming solvent flowing into the stator body 50 from a separate source feeding inlet 53. Embodiments of the sensor 62 may be a pressure sensor, a transducer, a pressure transducer, flow rate sensor, or any sensing element capable of measuring and/or detecting a pressure and flow rate of a solvent flowing past the sensor 62 and communicating such data/information to a control system/computing system associated with the liquid chromatography system. A cavity within the stator body 50 may be created to house or otherwise accommodate the sensor 62, at a point along the fluidic channel 10'.

Further, embodiments of the fluidic channel 10' may have a restrictor element 15' for restricting the fluid flowing through the restrictor 100. Embodiments of the restrictor element 15' may be a section of the fluidic channel 10' that extends a distance that the solvent may travel, along a same diffusion bonded layer of the stator block. In an exemplary embodiment, the restrictor element 15' may be located at an end of the fluidic channel 10'. An end of the restrictor element 15' may be connected to vertical segment 17', which may fluidically connect the fluidic channel 10', and the restrictor element 15', to a fluidic channel of the external element 70', described in greater detail infra. The vertical segment 17' may be formed, for example, by drilling through one or more layers before diffusion bonding the layers together.

A fluidic channel having a restrictor element 25' may interconnect with vertical segment 17' at some point along the vertical segment 17'. For instance, the fluidic channel having restrictor 25' may connect, join, intersect, etc. with the vertical segment 17' at a different diffusion bonded layer than the diffusion bonded layer containing the fluidic channel 10'. In an exemplary embodiment, the fluidic channel having restrictor 25' may connect, join, intersect, etc. with the vertical segment at a different diffusion bonded layer that is below the diffusion bonded layer containing the fluidic channel 10'. Embodiments of the restrictor element 25' may be a section of fluidic channel connecting to the vertical segment 17' that extends a distance that the solvent may travel, along a same diffusion bonded layer of the stator block. In an exemplary embodiment, the restrictor element 25' may be located at an end of the fluidic channel connecting to the vertical segment 17'. An end of the restrictor element 25' may be connected to vertical segment 27', which may fluidically connect the fluidic channel associated with the restrictor element 25', to a fluidic channel of the external element 70', described in greater detail infra. The vertical segment 27' may be formed, for example, by drilling through one or more layers before diffusion bonding the layers together.

A fluidic channel having a restrictor element 35' may interconnect with vertical segment 27' at some point along the vertical segment 27'. For instance, the fluidic channel having restrictor 35' may connect, join, intersect, etc. with the vertical segment 27' at a different diffusion bonded layer than the diffusion bonded layer containing the fluidic channel connecting to the vertical segment 17'. In an exemplary embodiment, the fluidic channel having restrictor 35' may connect, join, intersect, etc. with the vertical segment 27' at a different diffusion bonded layer that is below the diffusion bonded layer containing the fluidic channel connecting to vertical segment 17'. Embodiments of the restrictor element 35' may be a section of fluidic channel connecting to the vertical segment 27' that extends a distance that the solvent may travel, along a same diffusion bonded layer of the stator block. In an exemplary embodiment, the restrictor element 35' may be located at an end of the fluidic channel connecting to the vertical segment 27'. An end of the restrictor element 35' may be connected to vertical segment 37', which may fluidically connect the fluidic channel associated with the restrictor element 35', to a fluidic channel of the external element 70', described in greater detail infra. The vertical segment 37' may be formed, for example, by drilling through one or more layers before diffusion bonding the layers together.

Figure 3:
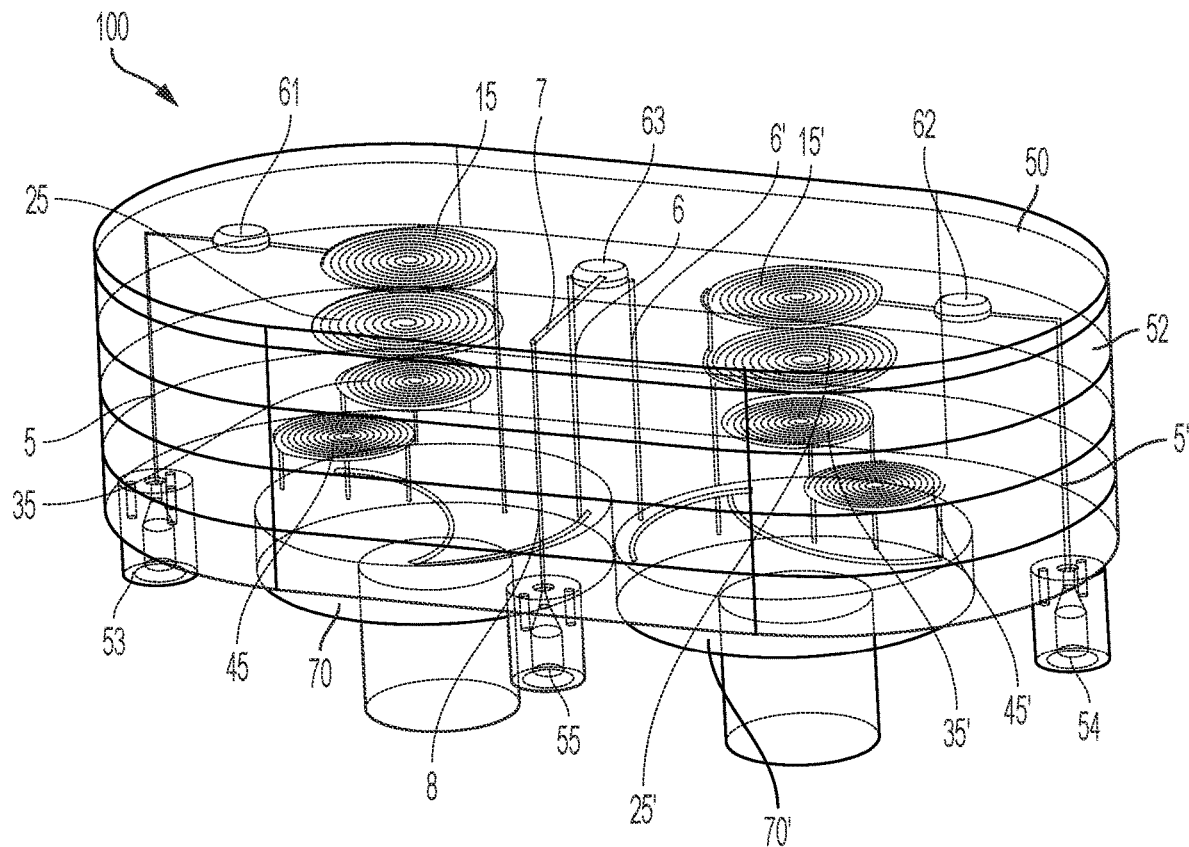
FIG. 3 depicts a perspective, transparent view of the variable fluidic restrictor, showing a plurality of restrictor elements, in accordance with embodiments of the present invention.

With reference now to FIG. 3, which depicts a perspective, transparent view of the variable fluidic restrictor 100, showing a plurality of restrictor elements 15, 15', 25, 25', 35, 35', in accordance with embodiments of the present invention. Embodiments of the restrictor elements 15, 15', 25, 25', 35, 35' may be a serpentine shaped section of fluidic channel. For instance, embodiments of the restrictor elements 15, 15', 25, 25', 35, 35' may be a section of a fluidic channel configured to wind, coil, weave, etc. around in a serpentine manner in a same diffusion bonded layer of the stator body, to extend a flow path distance from inlet 53 to outlet 54. In an exemplary embodiments, the restrictor elements 15, 15', 25, 25', 35, 35' may include a constant cross-section from a beginning to an end of the restrictor elements 15, 15', 25, 25', 35, 35'. In other embodiments, the restrictor elements 15, 15', 25, 25', 35, 35' may have a gradually decreasing cross-section (e.g. tapered cross-section), or an intermittently increasing and decreasing cross-section to further control a fluid restriction of the fluid flowing through the restrictor elements 15, 15', 25, 25', 35, 35'. Moreover, exemplary embodiments of the restrictor elements 15, 15', 25, 25', 35, 35' may have an obstruction-free internal pathway; however, in some embodiments, the internal pathways of the restrictor elements 15, 15', 25, 25', 35, 35' may be packed or partially packed with material to further restrict the flow of the fluid through the restrictor elements 15, 15', 25, 25', 35, 35'. The positioning of the restrictor elements 15, 15', 25, 25', 35, 35' within the stator 50 shown in FIG. 3 is merely exemplary, and the restrictor elements 15, 15', 25, 25', 35, 35' may be oriented differently with respect to each other, depending on a desired or chosen configuration of the fluidic channels within the stator 50.

Figure 4:
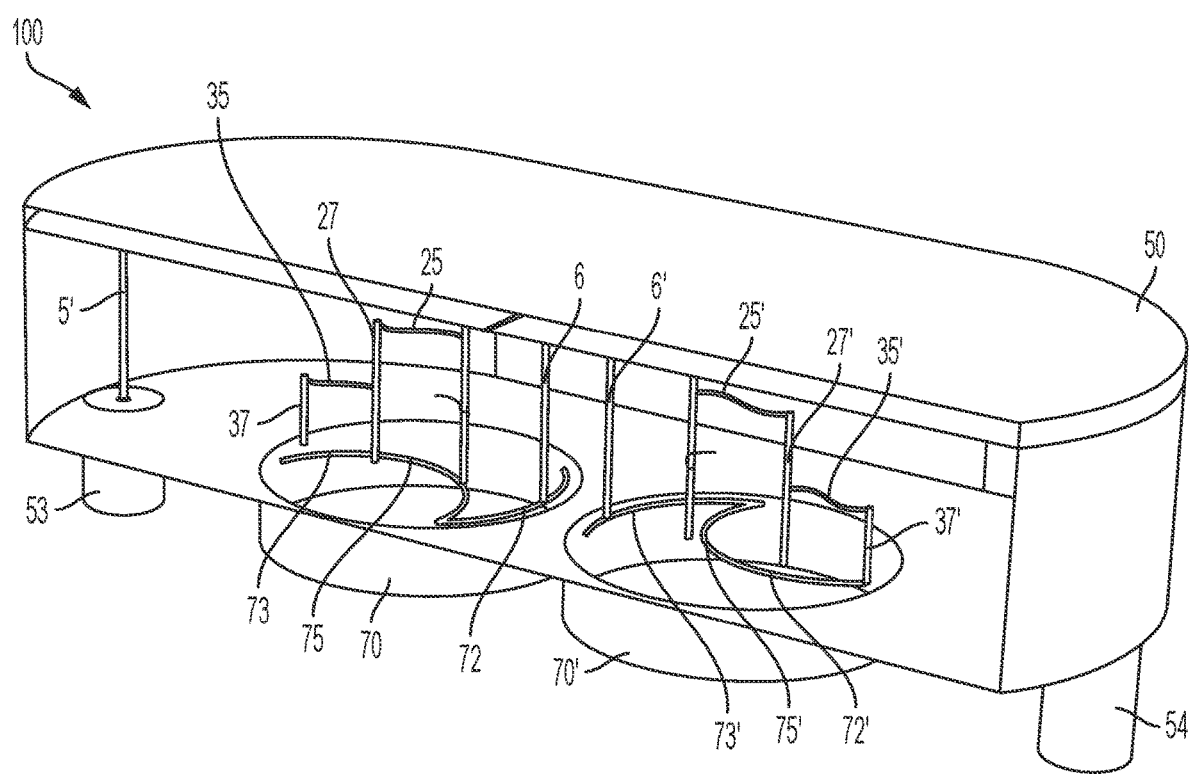
FIG. 4 depicts a second cutaway view of the variable fluidic restrictor of FIG. 1, showing a plurality of fluidic channels located within the stator body and an external element coupled to the stator body, in accordance with embodiments of the present invention.

Referring now to FIG. 4, which depicts a second cutaway view of the variable fluidic restrictor 100 of FIG. 1, showing a plurality of fluidic channels located within the stator body and an external element 70, 70' coupled to the stator body 50, in accordance with embodiments of the present invention. In the cutaway view of FIG. 3, the fluidic channels 5, 5', 6, 6', 10, 10', 17, 17' 25, 25', 27, 27', 35, 35', 37, 37' and other components are depicted by black and white lines, while the normally solid portions of the stator body 50 and external element 70, 70' are shown transparent to allow viewing of the microfluidic channels within the stator body 50.

Embodiments of the variable fluidic restrictor 100 may include an external element 70, 70' in cooperation with the stator body 50 (e.g. coupled to, in rotor/stator relationship, a connection forming a sealed connection therebetween), the external element 70, 70' having a fluidic channel 75, 75' fluidically coupled to the outlet 55 of the variable fluidic restrictor 100, and: a first outlet (e.g. outlet of vertical segment 17, 17'), or a second outlet (e.g. an outlet of vertical segment 27, 27'), or third outlet (e.g. outlet of vertical segment 37, 37'). In embodiments where the variable fluidic restrictor 100 includes more than three restrictor elements associated with inlet 53, the fluidic channel 75 may connect to the to the outlet 55 of the variable fluidic restrictor 100, and one of the more than three vertical segments associated with the restrictor elements 15, 25, 35. Similarly, in embodiments where the variable fluidic restrictor 100 includes more than three restrictor elements associated with inlet 54 the fluidic channel 75' may connect to the to the outlet 55 of the variable fluidic restrictor 100, and one of the more than three vertical segments associated with the restrictor elements 15', 25', 35'. For example, FIG. 3 depicts an embodiment of a variable fluidic restrictor 100 having more than three restrictor elements, with restrictor element 45, 45' being shown associated with inlets 53, 54, respectively.

Embodiments of the vertical segments 17, 27, 37 (e.g. associated with the first inlet 53) may each be configured to fluidically connect to the fluidic channel 75 of the external element 70. However, only one of the vertical segments 17, 27, 37 may be fluidically connected to the fluidic channel 75 of the external element 70 at a given time based on a position of the external element 70. For instance, depending on a physical position of the external element 70, one of the vertical segments (e.g. vertical segment 17) may be fluidically connected and/or aligned with the fluidic channel 75, while the other segments (e.g. vertical segments 27, 37) may be misaligned and not fluidically connected to the fluidic channel 75 of the external element 70. As shown in FIG. 4, embodiments of the vertical segment 17 is fluidically connected and aligned with the fluidic channel 75 of the external element 70, which means that a fluid flowing through the vertical segment 17 (i.e. through fluidic channel 10 and restrictor 15) may enter the fluidic channel 75 of the external element 70, and flow through the fluidic channel 75 to enter the vertical segment 6. The flow of fluid through the vertical segments misaligned and not connected to the fluidic channel 75, based on a given position of the external element 70, may essentially be plugged by a solid surface of the external element 70.

Likewise, embodiments of the vertical segments 17', 27', 37' (e.g. associated with the second inlet 54) may each be configured to fluidically connect to the fluidic channel 75' of the external element 70'. However, only one of the vertical segments 17', 27', 37' may be fluidically connected to the fluidic channel 75' of the external element 70' at a given time based on a position of the external element 70'. For instance, depending on a physical position of the external element 70', one of the vertical segments (e.g. vertical segment 37') may be fluidically connected and/or aligned with the fluidic channel 75', while the other segments (e.g. vertical segments 17', 37') may be misaligned and not fluidically connected to the fluidic channel 75' of the external element 70'. As shown in FIG. 4, embodiments of the vertical segment 37' is fluidically connected and aligned with the fluidic channel 75' of the external element 70', which means that a fluid flowing through the vertical segment 37 (i.e. through fluidic channel 10 and restrictors 15', 25', and 35') may enter the fluidic channel 75' of the external element 70', and flow through the fluidic channel 75' to enter the vertical segment 6'. The flow of fluid through the vertical segments misaligned and not connected to the fluidic channel 75', based on a given position of the external element 70', may essentially be plugged by a solid surface of the external element 70'.

Figure 5:
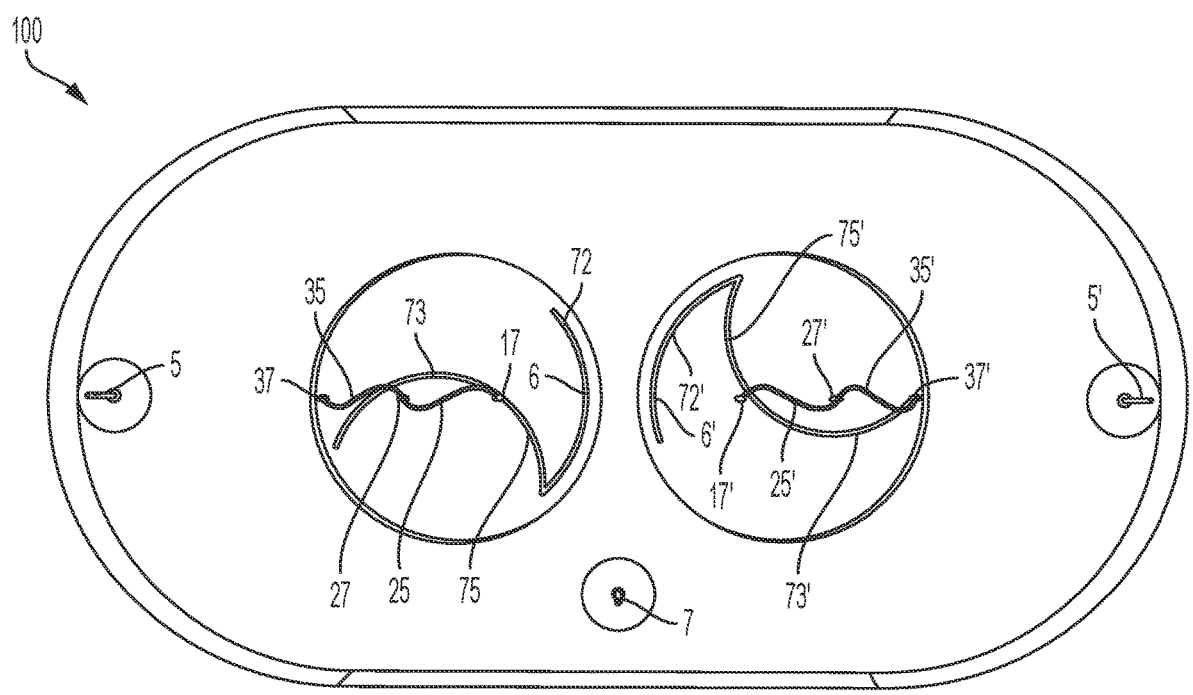
FIG. 5 depicts a plan view of the fluidic channels of the external elements coupled to the stator body, in accordance with embodiments of the present invention.

FIG. 5 depicts a plan view of the fluidic channels 75, 75' of the external elements 70, 70' coupled to the stator body 50, in accordance with embodiments of the present invention. Embodiments of the fluidic channel 75, 75' may be comprised of a first arced channel portion 72, 72' and a second arced channel portion 73, 73' forming a single fluidic pathway 75, 75' extending continuously from a first end of the fluidic channel 75, 75' to a second end of the fluidic channel 75, 75'. Embodiments of the first portion 72, 72' may be an arc extending along an outside of the external element 70, 70' and may always maintain connection to a single outlet (e.g. end of vertical segment 6, 6'). Embodiments of the first portion 72, 72' may have a constant radius with a center of rotation of the external element 70, 70' and which extends across a surface of the external element 70, 70' in a way that lets the external element 70, 70' rotate maintain connection with the vertical segment 6, 6'.

The first portion 72, 72', may remain fluidically coupled to vertical segment 6, 6', which is fluidically connected to the outlet 55 of the variable fluidic restrictor 100, when the external element 70, 70' moves/rotates between positions. For instance, the arc shape of the first portion 72, 72' of the fluidic channel 75, 75' may allow the fixed vertical segment 6, 6' to remain fluidically connected to the fluidic channel 75, 75' as the external element 70, 70' rotates in a clockwise or counterclockwise direction to switch between position for selectively restricting the flow of the fluid. Embodiments of the second arced channel portion 73, 73' may be selectively fluidically coupled to one of the first outlet (e.g. outlet end of vertical segment 17) and the second outlet (e.g. outlet end of vertical segment 27), depending on the position of the external element 70, 70'. In other words, as the external element 70, 70' rotates, the third portion 73, 73' may pass across multiple outlets associated with the plurality of fluidic channels located within the stator body 50.

As shown in FIG. 5, the vertical segment 17 is fluidically connected to the fluidic channel 75. To achieve a fluidic connection between the vertical segment 27 and the fluidic channel 75 from the position depicted in FIG. 5, the external element 70 may be actuated to rotate counterclockwise until the second portion 73 of the fluidic channel 75 is aligned with an outlet end of the vertical segment 27; the first portion 72 remains fluidically connected to the vertical segment 6 during the movement of the external element 70. To achieve a fluidic connection between the vertical segment 37 and the fluidic channel 75 from the position depicted in FIG. 5, the external element 70 may be actuated to rotate clockwise until the second portion 73 of the fluidic channel 75 is aligned with an outlet end of the vertical segment 37; the first portion 72 remains fluidically connected to the vertical segment 6 during the movement of the external element 70. FIG. 5 also shows the vertical segment 37' fluidically connected to the fluidic channel 75'. To achieve a fluidic connection between the vertical segment 27' and the fluidic channel 75' from the position depicted in FIG. 5, the external element 70' may be actuated to rotate counterclockwise until the second portion 73' of the fluidic channel 75' is aligned with an outlet end of the vertical segment 27'; the first portion 72' remains fluidically connected to the vertical segment 6' during the movement of the external element 70'. To achieve a fluidic connection between the vertical segment 17' and the fluidic channel 75' from the position depicted in FIG. 5, the external element 70' may be actuated to rotate clockwise until the second portion 73' of the fluidic channel 75' is aligned with an outlet end of the vertical segment 17'; the first portion 72' remains fluidically connected to the vertical segment 6' during the movement of the external element 70'.

Referring back to FIG. 3, fluid flowing from vertical segment 6 and vertical segment 6' may flow to sensor 63. Embodiments of sensor 63 may be positioned along fluidic channel 7 to measure a pressure and/or flow rate of the incoming solvent flowing after being restricted within the stator body 50. Embodiments of the sensor 63 may be a pressure sensor, a transducer, a pressure transducer, flow rate sensor, or any sensing element capable of measuring and/or detecting a pressure and flow rate of a solvent flowing past the sensor 63 and communicating such data/information to a control system/computing system associated with the liquid chromatography system. A cavity within the stator body 50 may be created to house or otherwise accommodate the sensor 63 and the fluids, at a point along the fluidic channel 8. Moreover, embodiments of the sensor 63 may measure a system pressure. The system pressure transducer 63 may provide a pressure differential between the first fluid (e.g. an aqueous solvent) after being restricted and a second fluid (e.g. other solvent) after being restricted. A pressure a flowing fluid one on side of the pressure sensor 63 may be different (e.g. greater or lower) than a pressure of a flowing fluid on the other side of the sensor 63, and a restriction between them. Because there may be a difference in viscosity between the first fluid and the second fluid, in order to generate enough pressure to obtain an accurate reading from the sensor 63 at an acceptable resolution to determine flow, more restriction may be needed for the fluid that is less viscous than the other fluid, otherwise the system has to pump at a very high velocity.

Further, the solvents associated with inlet and inlet 54 may be mixed within the fluidic channel 8, prior to exiting the outlet 55. Embodiments of the fluidic channel 7 may be fluidically connected to a vertical segment 8. Embodiments of the vertical segment 8 may be formed, for example, by drilling through one or more layers before diffusion bonding the layers together. The vertical segment 8 may connect the fluidic channel 7 to outlet 55 of the restrictor 100, which may be located on a different diffusion bonded layer of the stator body 50 than the outlet 55.

The manner in which a fluid is selectively restricted by the variable fluidic restrictor 100 with a rotor and a stator will now be described. A fluid, such as a solvent suitable for liquid chromatography applications, may enter the inlet 53 of the stator body 50. The fluid entering inlet 53 may flow up through the vertical segment 5 and across sensor 61 to provide an initial pressure value, flow rate, value, etc. Depending on a desired flow rate, pressure, etc. a flow rate or pressure may need to be restricted or otherwise adjusted. The restrictor elements 15, 25, 35 may provide a variable, selectable restriction to the fluid flowing into restrictor 100, based on an actuation of the external element 70. If the outlet flow (flow exiting outlet 55) is to only be restricted by the first restrictor element 15, then the external element is 70 is actuated into a position where the fluidic channel 75 of the external element 70 is aligned with an outlet end of the vertical segment 17. In this position of the rotor, the fluid flows through fluidic channel 10, through restrictor element 15 and then down through the vertical segment 17 into the fluidic channel 75. From there, the fluid flows through the fluidic channel 75 of the rotor, up the vertical segment 6 and across the sensor 63. After flowing across the sensor 63, and being potentially mixed with a different solvent associated with inlet 54, the fluid flows through fluidic channel 7 and down through vertical segment 8, eventually exiting the outlet 55 of the restrictor 100.

If the flow is to be further restricted (i.e. more restriction than provided by flowing only through restrictor element 15), then the external element 70 is actuated into a position (e.g. switched to another position) where the fluidic channel 75 of the external element 70 is aligned with an outlet end of the vertical segment 27. In this position of the rotor, the fluid flows through fluidic channel 10, through restrictor element 15 and then down through the vertical segment 17 and then into a fluidic channel having a second restrictor element 25 that is interconnected with the vertical segment 17. The fluid then flows through the second restrictor element 25 and then down the vertical segment 27 and into the fluidic channel 75. From there, the fluid flows through the fluidic channel 75 of the rotor, up the vertical segment 6 and across the sensor 63. After flowing across the sensor 63, and being potentially mixed with a different solvent associated with inlet 54, the fluid flows through fluidic channel 7 and down through vertical segment 8, eventually exiting the outlet 55 of the restrictor 100.

If the flow is to be even further restricted (i.e. more restriction than provided by flowing only through restrictor element 15 and restrictor element 25), then the external element 70 is actuated into a position (e.g. switched to another position) where the fluidic channel 75 of the external element 70 is aligned with an outlet end of the vertical segment 37. In this position of the rotor, the fluid flows through fluidic channel 10, through restrictor element 15 and then down through the vertical segment 17 and then into a fluidic channel having a second restrictor element 25 that is interconnected with the vertical segment 17. The fluid then flows through the second restrictor element 25 and then down the vertical segment 27 and then into a fluidic channel having a third restrictor element 35 that is interconnected with the vertical segment 27. The fluid then flows through the third restrictor element 35 and then down the vertical segment 37 and into the fluidic channel 75. From there, the fluid flows through the fluidic channel 75 of the rotor, up the vertical segment 6 and across the sensor 63. After flowing across the sensor 63, and being potentially mixed with a different solvent associated with inlet 54, the fluid flows through fluidic channel 7 and down through vertical segment 8, eventually exiting the outlet 55 of the restrictor 100. The fluid entering the second inlet 54 may be controlled and adjusted in the same or similar manner as described above with respect to the fluid entering inlet 53. The selective restriction of the fluid entering inlet 53 may be independent of a selective restriction of the fluid entering inlet 54. Accordingly, in an exemplary embodiment having a rotor that cooperates with the stator body 50, the external element 70, 70' may be actuated or otherwise switched from position to position to increase or decrease a restriction to the flow of the fluid, in accordance with a desired restriction of the flow.

Figure 6:
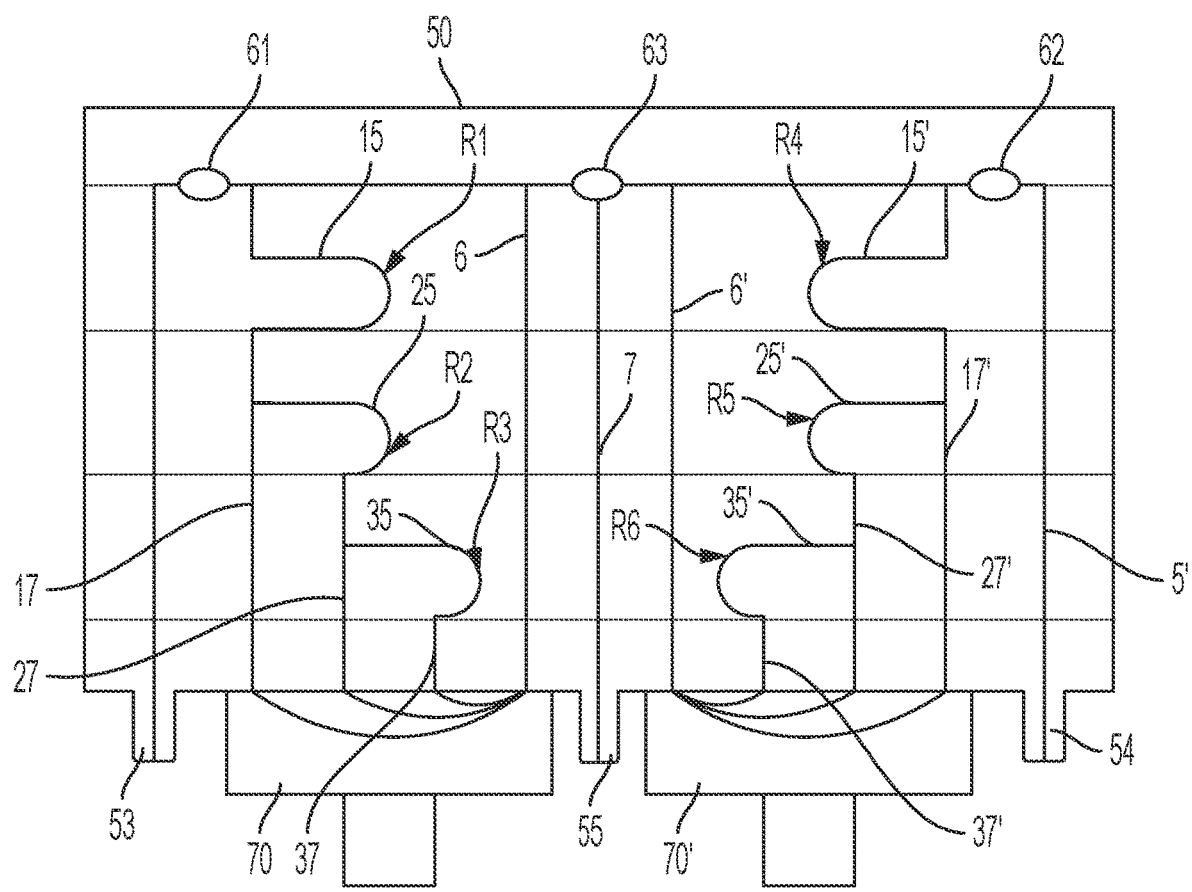
FIG. 6 depicts a schematic representation of the flow paths of the variable fluidic restrictor, in accordance with embodiments of the present invention.

Although a rotor may be one way to facilitate the connections between the plurality of fluidic channels internal to the stator 50 and an outlet 55 of the restrictor, other means may be used. For instance, embodiments of the variable fluidic restrictor 100 may selectively restrict a flow of a fluid, based on a variable connection between the plurality of fluidic channels and the outlet 55 of restrictor 100. In other words, embodiments of the variable fluidic restrictor 100 may allow for selective restriction to match a flow rate of two or more different solvents having different viscosities, including over a gradient if a ratio of first solvent to second solvent increases or decreases over time. FIG. 6 depicts a schematic representation of the flow paths of solvents through the variable fluidic restrictor 100. As shown in FIG. 6, if the outlet 17 is fluidically connected to the vertical segment 6, then the fluid flowing into inlet 54 may be restricted a single time resulting in a first restriction. If the outlet 27 is fluidically connected to the vertical segment 6, then the fluid flowing into inlet 54 may be restricted twice by the restrictor elements 15 and 25, resulting in a second restriction. If the outlet 37 is fluidically connected to the vertical segment 6, then the fluid flowing into inlet 54 may be restricted three times by the restrictor elements 15, 25, and 35, resulting in a third restriction. Embodiments of the restrictor 100 may include more restrictor elements than the three or four restrictor elements shown in the drawings. Whichever connection is made to restrict the first fluid entering inlet 54 may end up with a certain flow rate at the system pressure sensor 63, which may be matched by the selective restriction of the second fluid having a different viscosity than the first fluid. The selective restrictive of the second fluid entering inlet 54 may be performed to match the flow rate of the first fluid proximate the system pressure sensor 63, or vice versa. Accordingly, the variable restrictor 100 may be able to discretely change the restriction in response to the expected flow rates of two or more solvents with different viscosities.

Figure 7:
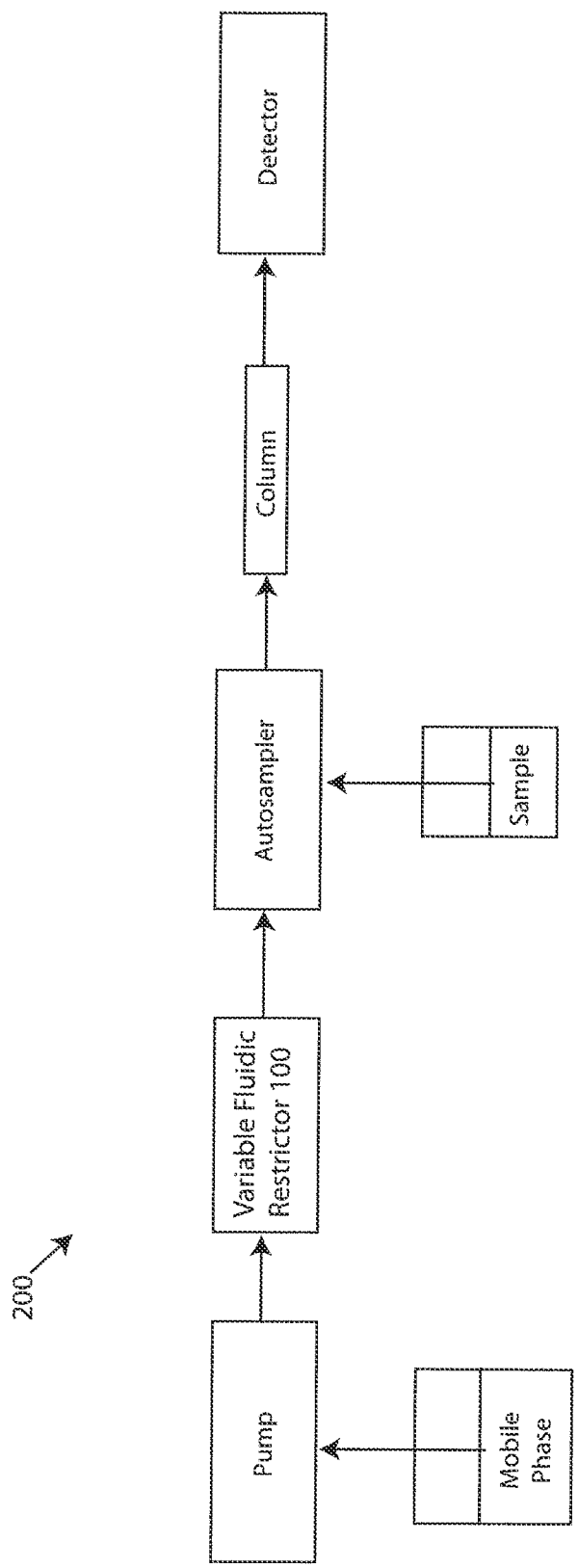
FIG. 7 depicts a schematic diagram of a liquid chromatography system 200, in accordance with embodiments of the present invention.

FIG. 7 depicts a schematic diagram of a liquid chromatography system 200, in accordance with embodiments of the present invention. Embodiments of a liquid chromatography system 200 may include a mobile phase, such as a solvent reservoir/source, one or more pumps, the variable fluidic restrictor 100, an autosampler in fluid communication with the sample, a column, and a detector, as known to those skilled in the art of liquid chromatography.

Referring now to FIGS. 1-7, a method for selective restriction of a flow of at least one solvent may include the steps of forming a first fluidic channel in a first diffusion bonded layer of a diffusion bonded stator body, the fluidic fluid channel having a first restrictor element and a first outlet, interconnecting a second fluidic channel with the first fluidic channel, the second fluidic channel formed in a second diffusion bonded layer of the diffusion bonded stator body, and having a second restrictor element and a second outlet, and selectively fluidically connecting an outlet of the diffusion bonded stator body with at least one of the first outlet of the first fluidic channel and the second outlet of the second fluidic channel, to control a restriction of the flow of the at least one solvent.

While this disclosure has been described in conjunction with the specific embodiments outlined above, it is evident that many alternatives, modifications and variations will be apparent to those skilled in the art. Accordingly, the preferred embodiments of the present disclosure as set forth above are intended to be illustrative, not limiting. Various changes may be made without departing from the spirit and scope of the invention, as required by the following claims. The claims provide the scope of the coverage of the invention and should not be limited to the specific examples provided herein.

What is claimed is:

1. A method for selective restriction of a flow of at least one solvent, the method comprising:
    forming a first fluidic channel in a first diffusion bonded layer of a diffusion bonded stator body, the first fluidic fluid channel having a first restrictor element and a first outlet;
    interconnecting a second fluidic channel with the first fluidic channel, the second fluidic channel formed in a second diffusion bonded layer of the diffusion bonded stator body, and having a second restrictor element and a second outlet; and
    selectively fluidically connecting an outlet of the diffusion bonded stator body with at least one of the first outlet of the first fluidic channel and the second outlet of the second fluidic channel by operating an external element coupled to the diffusion bonded stator body, to control a restriction of the flow of the at least one solvent;
    wherein, when the external element is operated to fluidically connect the outlet of the diffusion bonded stator body to the second outlet, a fluidic pathway of the external element is fluidically connected to the second outlet.

2. The method of claim 1, wherein the fluidic pathway of the external element includes at least two arced portions configured to fluidically connect to the first outlet and the second outlet, depending on a position of the external element.

3. The method of claim 1, wherein, when the outlet is selectively fluidically connected to the first outlet, the at least one solvent is restricted by the first restrictor element only.

4. The method of claim 1, wherein, when the outlet is selectively fluidically connected to the second outlet, the at least one solvent is restricted by the first restrictor element and the second restrictor element, thereby further increasing a restriction of the at least one solvent as compared to being restricted by the first restriction element only.

5. A method for selective restriction of a flow of at least one solvent, the method comprising:
    forming a first fluidic channel in a first diffusion bonded layer of a diffusion bonded stator body, the first fluidic fluid channel having a first restrictor element and a first outlet;
    interconnecting a second fluidic channel with the first fluidic channel, the second fluidic channel formed in a second diffusion bonded layer of the diffusion bonded stator body, and having a second restrictor element and a second outlet; and
    selectively fluidically connecting an outlet of the diffusion bonded stator body with at least one of the first outlet of the first fluidic channel and the second outlet of the second fluidic channel, to control a restriction of the flow of the at least one solvent;
    wherein an external element is configured to be coupled to the diffusion bonded stator body to perform the selectively fluidically connecting;
    wherein, when the outlet is selectively fluidically connected to the second outlet, the at least one solvent is restricted by the first restrictor element and the second restrictor element, thereby further increasing a restriction of the at least one solvent as compared to being restricted by the first restriction element only.

6. The method of claim 5, wherein, when the outlet is selectively fluidically connected to the first outlet, the at least one solvent is restricted by the first restrictor element only.

* * * * *